US012143500B2

(12) United States Patent
Maj et al.

(10) Patent No.: US 12,143,500 B2
(45) Date of Patent: Nov. 12, 2024

(54) SYSTEM AND METHOD FOR CONTENT STORAGE AND OWNERSHIP VERIFICATION

(71) Applicant: The Samo Project, Philadelphia, PA (US)

(72) Inventors: Michael Maj, Penn Valley, PA (US); Joseph Kelley, Bala Cynwyd, PA (US); Noah Spochart, Hummelstown, PA (US); Chaitanya Maddukuri, Hummelstown, PA (US)

(73) Assignee: THE SAMO PROJECT, Philadelphia, PA (US)

(*) Notice: Subject to any disclaimer, the term of this patent is extended or adjusted under 35 U.S.C. 154(b) by 317 days.

(21) Appl. No.: 17/368,211

(22) Filed: Jul. 6, 2021

(65) Prior Publication Data
US 2022/0006642 A1 Jan. 6, 2022

Related U.S. Application Data

(60) Provisional application No. 63/048,455, filed on Jul. 6, 2020.

(51) Int. Cl.
*H04L 9/32* (2006.01)
*H04L 9/00* (2022.01)
(52) U.S. Cl.
CPC .......... *H04L 9/3239* (2013.01); *H04L 9/3213* (2013.01); *H04L 9/50* (2022.05)

(58) Field of Classification Search
CPC ....... H04L 9/3239; H04L 9/3213; H04L 9/50; H04L 63/123; H04L 2209/56
See application file for complete search history.

(56) References Cited

U.S. PATENT DOCUMENTS

| | | | |
|---|---|---|---|
| 2016/0380771 A1* | 12/2016 | Pepin | G06F 21/51 |
| | | | 713/187 |
| 2019/0220836 A1* | 7/2019 | Caldwell | G06Q 20/38215 |
| 2020/0019963 A1* | 1/2020 | Nakamura | G06Q 20/401 |
| 2020/0074518 A1* | 3/2020 | Kumaraswamy | H04L 63/12 |
| 2020/0076798 A1* | 3/2020 | Lidsky | H04L 63/083 |
| 2020/0160289 A1* | 5/2020 | Mahajan | G06Q 20/02 |
| 2020/0250633 A1* | 8/2020 | Vinson | G06Q 20/4015 |
| 2021/0042746 A1* | 2/2021 | Westland | G06F 16/2379 |
| 2021/0091941 A1* | 3/2021 | Pancras | H04L 9/0863 |
| 2021/0099309 A1* | 4/2021 | Winarski | H04L 67/1097 |
| 2021/0150626 A1* | 5/2021 | Robotham | G06Q 50/28 |
| 2021/0167963 A1* | 6/2021 | Autry | H04L 9/3239 |
| 2021/0243272 A1* | 8/2021 | Diesch | H04L 67/60 |
| 2021/0248594 A1* | 8/2021 | Yantis | G06F 21/602 |
| 2022/0166609 A1* | 5/2022 | Igarashi | H04L 9/3239 |

* cited by examiner

*Primary Examiner* — Taghi T Arani
*Assistant Examiner* — Blake I Narramore
(74) *Attorney, Agent, or Firm* — Cozen O'Connor

(57) ABSTRACT

A method that ensures validity, reliability, preservation, and accessibility of data and its related metadata for an underlying asset or project using blockchain technology, specifically non-fungible tokens, the modern cloud, and cryptography.

21 Claims, 28 Drawing Sheets

Figure 13 - Review Process

SYSTEM AND METHOD FOR CONTENT STORAGE AND OWNERSHIP VERIFICATION

CROSS REFERENCE TO RELATED APPLICATIONS

The present application for patent claims the benefit of U.S. Provisional Patent Application No. 63/048,455 filed Jun. 6, 2020 the content of which is incorporated herein by reference.

FIELD OF THE INVENTION

The present invention relates to smart contracts and more specifically to non-fungible tokenization of smart contracts.

DESCRIPTION OF RELATED ART

A non-fungible token (NFT) is a special type of cryptographic token that represents something unique. Non-fungible tokens are not interchangeable unlike cryptocurrencies and many network or utility tokens that are fungible in nature.

SUMMARY OF THE INVENTION

Disclosed is a platform that has been developed in order to simplify and ensure proper execution of data management through a variety of processes that run simultaneously. The platform is referred to as Samos.

Samos is built with mobility between industries in mind. Using proprietary admin tools, users are able to define specific data fields for which they want data stored on the blockchain, also referred to as "inputs" or "input fields". This means it requires little effort to switch between various industries such as the music industry and real estate industry. All data fields that are created are stored on the blockchain as part of a project's root object.

Samos's platform is used to create a history of all information regarding an asset. Samos creates an infrastructure using the cloud and blockchain that streamlines the process of recording and storing files and information of an asset or project. Having easily verifiable and accessible data creates synergies within an organization that limits the pitfalls of data loss and version control issues.

Inputs are defined in accordance with a specific configuration created within the "Admin Panel". The configuration for the Admin Panel is shown with respect to FIG. 11 and discussed in detail below. These inputs include, but are not limited to files, text, number, table, and even dialogs. The inputs are defined prior to the configuration of their interface. According to one aspect of the invention, the inputs are defined by the user. Alternatively, the inputs are predetermined by an administrator. Once the inputs are defined, it allows for the user to create new projects within their interface.

Project inputs are completed and any necessary files are uploaded to Microsoft Azure Blob Storage. The user submits the project, which triggers the JavaScript Object Notation (JSON) metadata upload of all the inputs. The metadata resides publicly at a permalink also on Microsoft Azure Blob Storage and is also compliant with the ERC-721 NFT Token standard for metadata bodies. After all files and metadata have been successfully streamed into Azure Storage, Samo uses an MD5 hashing algorithm to ensure validity of file inputs and the manner in which the file inputs are structured in their Azure Storage directory. For each file belonging to a project, a hash is created from its content. Subsequently, a combined hash or "Double Hash" is created as discussed with respect to FIG. 2 from all of the subsequent hashes, which ensures that the only valid file structure, for a given project, is one that matches the unique concatenated hash. Once Samos has both the metadata permalink and the project files fingerprint, an Azure Function is triggered that mints a new NFT Token sending both the metadata permalink and the fingerprint through our custom Solidity smart contract as a single transaction. This process stores both the metadata and the fingerprint on the blockchain in memory and in an immutable transaction that can never be modified. To make any changes to a project, a new token is created that replaces its predecessor as the most up to date version of a project. However, the history of all project input changes is still stored on the blockchain in perpetuity to ensure authenticity as a project evolves over time.

Unlike other management platforms that dominate the contemporary marketplace for content storage, in an easily accessible and unified cloud-based platform, the disclosed platform is focused on the verification of ownership. The disclosed platform is a step beyond the unworkable and false dichotomy around which the digital age of ownership has rotated: either systems of content are decentralized, open and without rights for creators or they are centralized, highly regulated and lacking in creative spontaneity. The disclosed platform provides an architecture without this binary choice. It is a platform that seamlessly binds metadata and content on a decentralized platform that enhances engagement and ownership rights. Specifically, in on aspect of the invention, the tokenization and verification are decentralized whereas the front end is centralized.

The platform identity model revolves around two inseparable components: data and transparency. Unique metadata is ingested into the platform in conjunction and united with content in the blockchain, preferably configured as an ethereum blockchain. Importantly for establishing ownership and transparency that goes beyond narrow groups with technical proficiency in such technology, this data is recorded and delivered in metadata blobs and wallet tokens that are meaningful/readable to ordinary end users. In addition, all updates or changes to files are tracked with clarity about provenance and ownership. If the identity of an owner is rightfully changed, a new unique token can be issued. It should be noted that while transparency is a key to the present system, various fields can be maintained in secret to comply with HPAA, other privacy requirements, or if the owners wish to maintain certain details as confidential.

The Samos stack centralizes the concept of custody. By utilizing a distributed technology, knowledge of ownership, legal stakes, and guardianship in any asset is enhanced with further replication of the ethereum ledger. In this way, the technological stack on which Samos is built is meant to continually enhance the validity of claims concerning trust in ownership. Furthermore, the decentralized, fully auditable, and self-replicating nature of the blockchain network is the one of the best forms of security in an inherently insecure world of transactions.

According to one aspect of the invention, hashing is utilized for completeness and accuracy. An issue with the way "hashing" is currently performed is that it is difficult to ensure a completeness of file sets. While a file may be hashed and unaltered, resulting in the same hash therefore authenticating it, if a project has multiple files relating to it, it is difficult to ensure that all files are in possession because, although the files in possession may be authentic and no errors are returned, it does not ensure that all files of a relating set are present. According to one aspect of the invention, a "Double Hashing" mechanism is able to ensure completeness by adding an extra step that when checking a file set, would result in an error if incomplete.

According to one aspect of the invention, all files are first hashed individually. It is possible to validate that each individual file has integrity. A second hash provides a mechanism by which completeness of a file sets integrity is verified. By generating a second hash of the various files and input hashes, it is only possible to return the same hash in the future when two factors are met, first when the files themselves remain unchanged and second, when all files are present. Previous hashing methods were able to provide accuracy of file sets, but never ensure that all data was present.

The present invention is applicable to multiple industries. The industries and applications include, but are not limited to, tax reporting, financial reporting, regulatory reporting, birth certificates, voting, accounting, auditing and assurance, asset management, real estate, digital artwork, artwork, music, construction, legal industry, governmental reporting and oversight, pharmaceuticals, shipping regulatory, reporting, receipting, insurance, law enforcement, automotive industry, jewelry, political campaign financing, banking, personal information, infrastructure security advertising, supply chain management, energy, weapons and military, human resource at companies to keep track of employees health and benefits, credit history validation, publishing, gambling, waste management, international banking, voting, and the like.

DESCRIPTION OF FIGURES

The invention will be described in more detail on the basis of an exemplary embodiment. In the figures:

FIG. 14 is an input field for music rights;
FIG. 24 shows a transaction history.

DETAILED DESCRIPTION OF FIGURES

Figure 1:
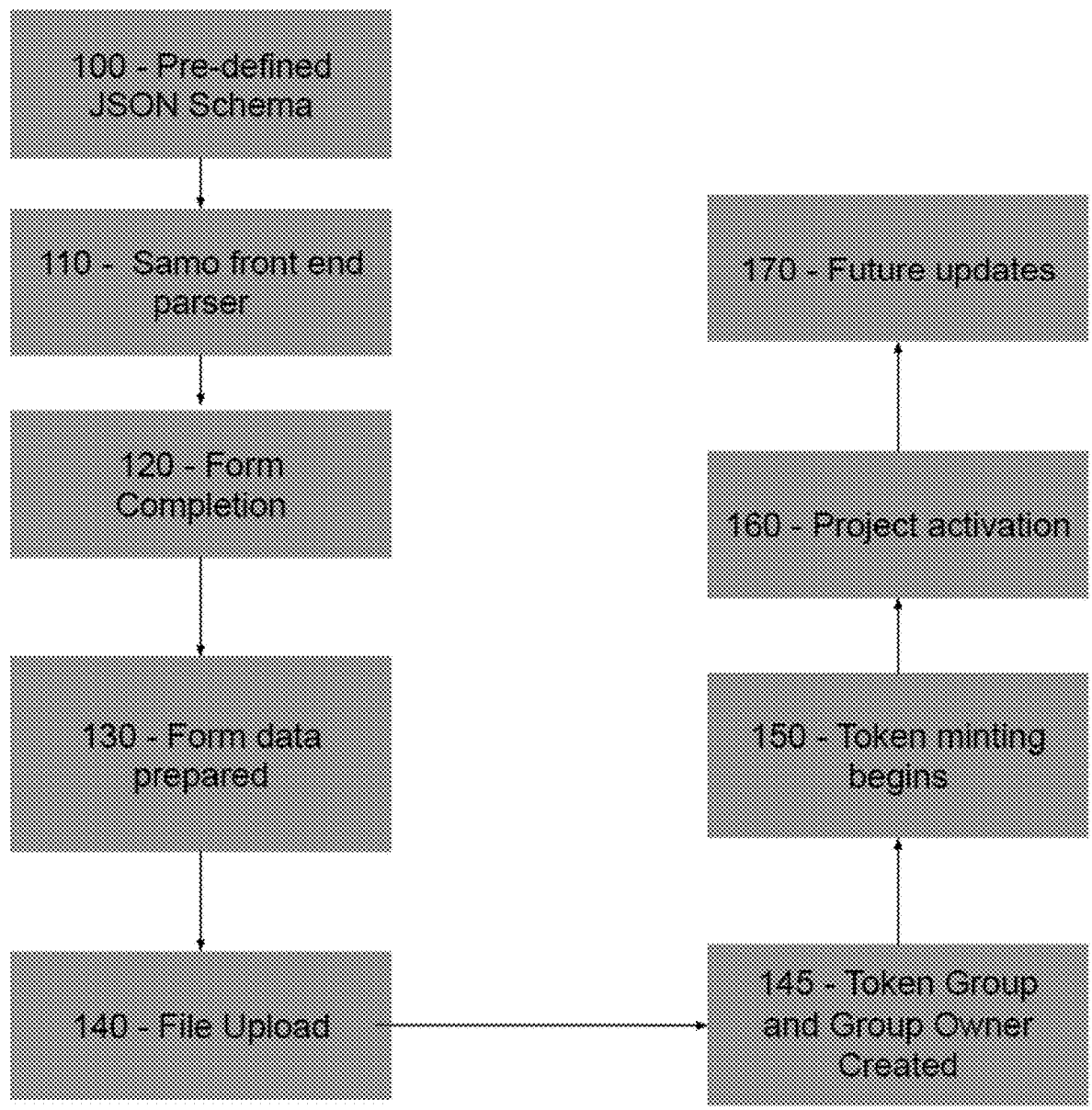
FIG. 1 is an overview of the entire data processing method.

FIG. 1 is an overview of the platform. As discussed below, a user establishes relevant fields for a given project. A form for the relevant data is generated into which data is entered. Data for a specific project is entered and then the data is tokenized and added to the blockchain. Future updates to the project are entered, tokenized, and recorded to the blockchain.

In block 100 input fields and their configurations from the admin dashboard (FIG. 11) are converted into a JSON format. While some conversion to a JSON format is required, there is no specific manner or process by which this conversion takes place. This conversion is performed so that the Samo front end parser can render the chosen inputs. The render essentially reads the JSON and parses out the fields and converts them into an HTML input. The render further fills in attributes based on predefined keys in the JSON object that were created in the admin dashboard.

In block 110 a front end parser takes the JSON Input Fields that were defined in block 100 and renders the form that users can then use to populate the requisite fields with the related data. This ultimately is the data that ends up in the NFT Token as discussed with respect to FIG. 3 below along with any additional relevant files.

In block 120 the data captured during the data ingestion from the client or the user populates the fields that were previously configured in the Admin Panel. Once all of the data is entered, the system initiates a review process prior to proceeding with a remainder of the process. The review process is discussed below with respect to FIG. 13.

Figure 7:
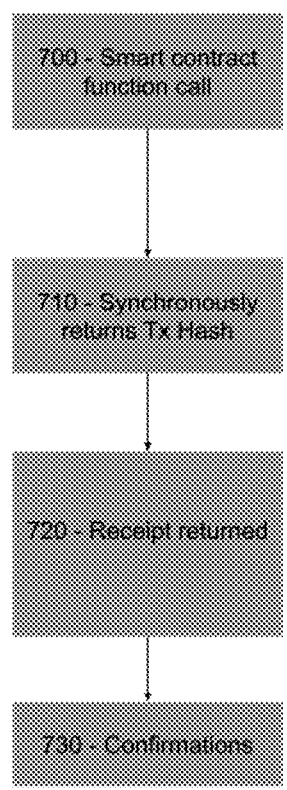
FIG. 7 is a flowchart of Blockchain Events.

In block 130 the data populated into the inputs of the form is converted into JSON and sent to the blockchain API as shown in FIG. 7 discussed below. In block 140, following the conversion to JSON and transmission to the Blockchain API, the files are uploaded into the storage blob. The upload into the storage blob triggers a Double Hashing Process discussed below with respect to FIG. 2.

After the data is sent to the blockchain API a Group and Group Owner is created in Block 145. Once a project is created and prior to the minting of the initial token, which is a first version of any project, a group will be created and ownership will be assigned to the wallet of the creator. According to one aspect of the invention, a 100% ownership assigned to the wallet of the creator. This allows for ownership splits and permanent ownership percentages in any given token in perpetuity After the Double Hashing Process, block 150 is a mint function for the smart contract as detailed in FIG. 3 below. In block 160, following the 24th confirmation in the blockchain events, as detailed in FIG. 7, the project and its initial token version is activated. The system is configured so that a project can be updated. Updates are stored to the block chain. Block 170 would only be triggered as part of the life cycle of a project, shown in FIG. 10, and is an optional step to amend any change to the project.

Figure 2:
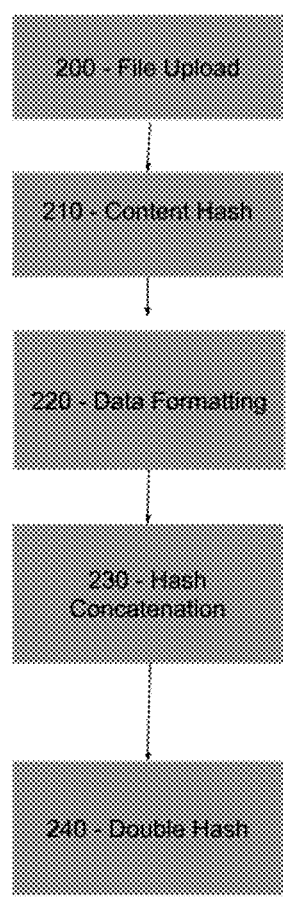
FIG. 2 is a Double Hashing Process.

FIG. 2 is a flowchart for a double hashing process. Initially, all of the project files for any given project are uploaded into a storage blob in block 200. A blob is unstructured data stored on a cloud server. However, other storage locations or formats can be utilized. Uploading the files and/or other content ensures that the files and/or other content are safely stored and preserved for each project. As discussed above, once the upload process is completed a hashing process is triggered in block 210. A Hash is used to produce a 128 bit value that represents the content of the input being hashed to verify data integrity. According to one aspect of the invention, the hashing process us an MD5 hash algorithm. The hashing performed in block 210 generates a first hash that represents the unique content of the file and is part of ensuring validity of content that is being ingested into the system or ensures validity of a previously ingested file or content based at least in part on a comparison of the first hash. It should be noted that the data, files, and additional content can be hashed individually or as a group.

In Block 220, project data entered into the input fields is captured in JSON and given its own MD5 hash. According to one aspect of the invention, all of the individual hashes from block 210 and the project data are concatenated in literal alphabetical order in block 220. It should be noted that other concatenation schemes are possible including size, opposite alphabetical order, and the like. The concatenation in block 230 prepares all of the hashes to be combined into a single hash.

In block 240, the concatenated hashes are run through the MD5 hash, which generates a singular hash representing all of the individual hashes. Hashes are stored in a Postgres database associated with the original project. In addition, both the double hash and the individual file hashes are stored in a Solidity smart contract associated with the struct that represents a non-fungible token (NFT token) and its "body" data. The smart contract receives a reference address once it is deployed.

Figure 3:
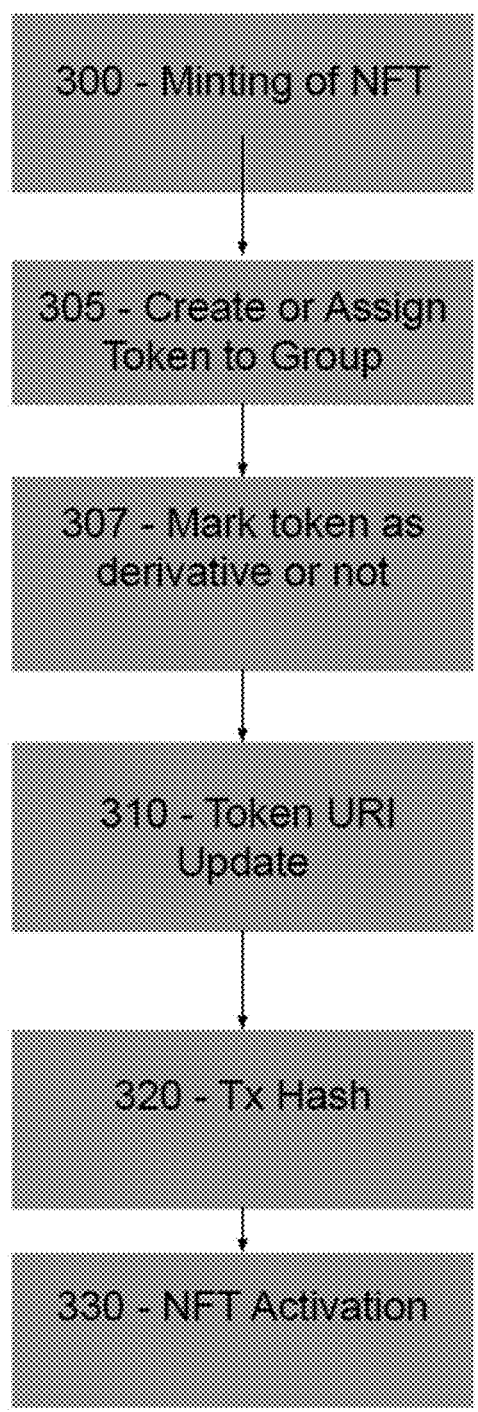
FIG. 3 is a flowchart of Tokenization.

FIG. 3 is a flowchart detailing a tokenization process. The process is the mining of an NFT token. In block 300, project data, the double hash, the metadata URI, and the like are sent as arguments to a smart contracts mint function. According to one aspect of the invention, Open Zepplin's official implementation of ERC-721 is used. This implementation includes the ability to track changes to metadata over time using Solidity structs against the existing NFT identifier. This functionality ensures that the process is always compliant with industry updates and 100% transparent with respect to how the tokens are created. According to one aspect of the invention, as the NFT space evolves, the process uses the most recent standard in production. This combines all aspects of the project into a single token on the blockchain. This represents all underlying content and information and validates the authenticity.

In block 305 a group id is provided and access is verified. Subsequent tokens are included within a given group established at block 145. If no group exists prior to assign token a new group is created in a manner as discussed with respect to block 145. Before an NFT is placed in group, a check is performed to determine if access to that group is provided by the sender or creator of the NFT.

A new token should be marked as derivative or not derivative. In block 307 a new token will be marked as derivative by the system as applicable. A new token is derivative means that it has different attributes and fields of information than the core master token but the new token is connected as relevant within the project.

In block 310 the token URI is updated. The Token URI is a unique identifier that uses the metadata URL to refer to the NFT's content. The Token URI is updated at its current index, which keeps consistency between token updates. According to one aspect of the invention, the application is given a unique domain that points to an object storage implementation selected by the user. When a project version is created, the version is assigned a unique slug that represents the filename of the JSON metadata file, i.e., <slug>.json. A slug is a unique randomly generated string of twelve characters that represents a version of any given project.

A Tx hash is generated in block 320. The Tx Hash is a unique transaction identifier that shows any changes to the NFT or Blockchain. When the blockchain receives the data in block 300, the Tx Hash is updated on the project. This allows for tracking of all amendments to project data through the life of the project. Each Tx Hash represents a modification to the project and its underlying content and information. In a block 330, according to one aspect of the invention, after the 24th confirmation the NFT's status is marked active in the project and represents the most up to date version, if this is the creation of a new project, it will be the first version. Once final confirmation goes through, the NFT can be transferred and it becomes an independent token on the block chain if desired.

Figure 4:
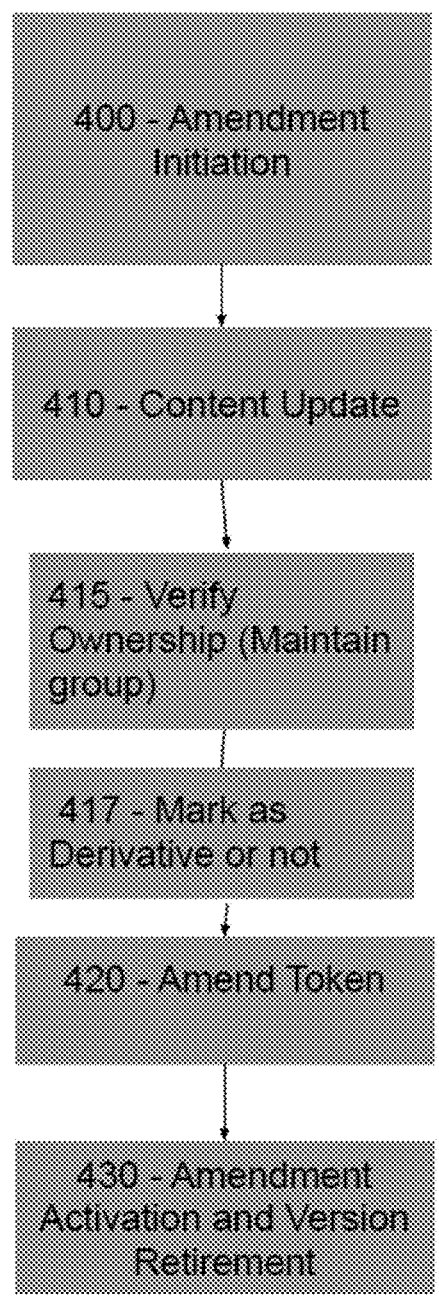
FIG. 4 is a flowchart of Project Amendments.

FIG. 4 is a flowchart of a project amendment. An amendment is initiated or triggered in block 400 by a user of the platform when some portion of a project's content changes and needs to be reflected on the blockchain. For example if content ownership transfers or terms of a contract are amended. In block 410, in a front-end platform, a user updates all information to reflect the changes and confirms the validity of the information through review controls discussed below in FIG. 13.

In block 415 ownership is verified. As a token is updated its group id will be provided. As long as the owner has access to that group the token will be added to that group. Next, in block 417, as discussed above, if appropriate, the new token should be marked as derivative. Thus, the new token has different attributes and fields of information but is connected as relevant within the project.

After the information is updated, the tokenization process discussed above with respect to FIG. 3 is initiated in block 420. This tokenization process amends the token to reflect the new information. To designate that the information has been updated previous versions of the NFT are marked as retired in block 430 as the newly amended NFT is activated. According to one aspect of the invention, with the new version's 24th confirmation, the old version's token status on the blockchain will be revised to show retired instead of active denoting that it is no longer valid. The marking is preferably simultaneous so that older versions are marked as retired in real time.

Figure 5:
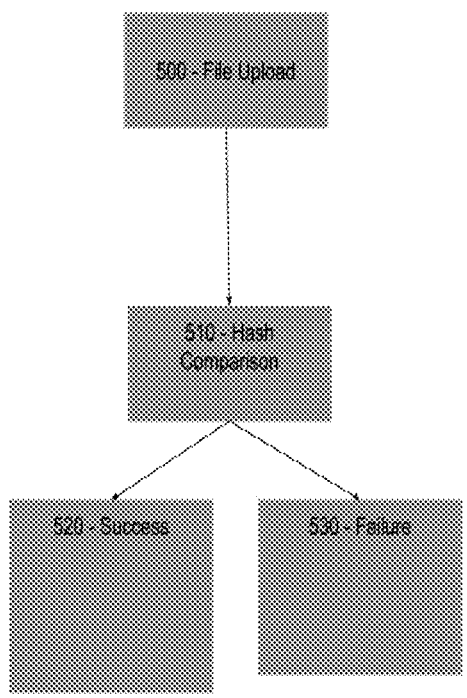
FIG. 5 is a flowchart of a Content Comparison.

FIG. 5 is a flowchart depicting content comparison. The process of FIG. 5 is used when to compare files in possession with files already on the blockchain to prove validity or invalidity of the files. In block 500, comparative files, the files in possession, are uploaded to be checked against files that were already minted into a token. In block 510 a "Double Hash" as described with respect to FIG. 2 is generated from the new file. This new "Double Hash" is compared to the double hash of all existing tokens on the blockchain. The platform is configurable to verify one specific instance of a token. The platform can also run a scan of all existing hashes to see if the current files exist on the blockchain. This can be used to ensure that the files in possession were valid at the time of the original minting of the token. The comparison compares the uploaded file's content MD5 with the stored file's content MD5. To compare all files for a project using the more secure double hash, the uploaded files are run through the double hashing process. The double hash of the uploaded file is then compared with the stored double hashes.

There are two possible outcomes of the comparison, success and failure. Success occurs in block 520 when the scan verifies that the "Double Hash" exists on the blockchain, which shows that the file set is complete and accurate when compared to the non-fungible token previously in existence. Failure in block 530 means that the double hash does not exist and therefore the file set is invalid.

Figure 6:
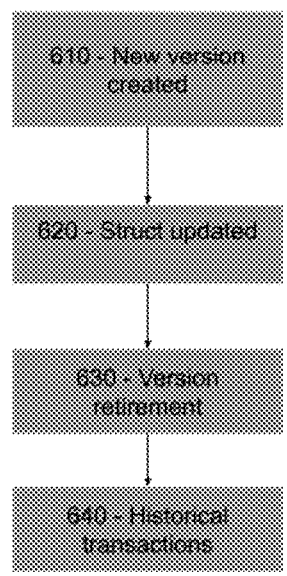
FIG. 6 is a flowchart of a Transaction History.

According to one aspect of the invention, transactions and revisions to a record are tracked. FIG. 6 is a flowchart showing transaction history tracking. Logging transaction history records, who makes an amendment, what was amended, and when the amendment was made.

An amendment occurs when a user amends a project that has already been completely run through the process. The amended version is a project amendment and tokenization process discussed above is completed. A New version of the project is created in block 610 that is transmitted to the blockchain. In block 620, once the NFT is activated on the 24th confirmation on the blockchain the struct in the contract is updated at the Token ID to reflect the project amendments. At this point, the Group and Group Owner is created if not already done and the Token ID is amended to include the Group and/or the Group Owner. This is now considered the most active and new version on the smart contract and the front end showing this is active. Once the struct is updated the prior version is retired at block 630. Retiring the prior version updates a list showing a log of all project versions, their Tx hash, and meta data URL at block 640.

FIG. 7 is a flowchart of blockchain events. Specifically, FIG. 7 are the events that occur on the blockchain via a smart contract. Use of the blockchain begins with a function. The function is, as used here, the creation of a NFT. In block 700 a function is called, for example the original creation of an NFT "Mint" discussed above with respect to FIG. 3 or "Update" as discussed above with respect to FIG. 4. In block 710, when the function receives data, a Tx hash is returned. The Tx hash represents data being transmitted to the blockchain and what is happening to the blockchain through linking to the smart contract. Once the data is entered in a form and placed in a block to be mined, a receipt is returned with all related information about the transaction in block 720. According to one aspect of the invention, this information is not used because it is not necessary to return to the project and just remains with the token. According to one aspect of the invention, as the transaction is being mined there are 24 confirmation events that are returned in block 730. Upon the 24th confirmed event the NFT is considered "Active". It should be noted that the number of confirmation events can be varied in accordance with the blockchain standard.

Figure 8:
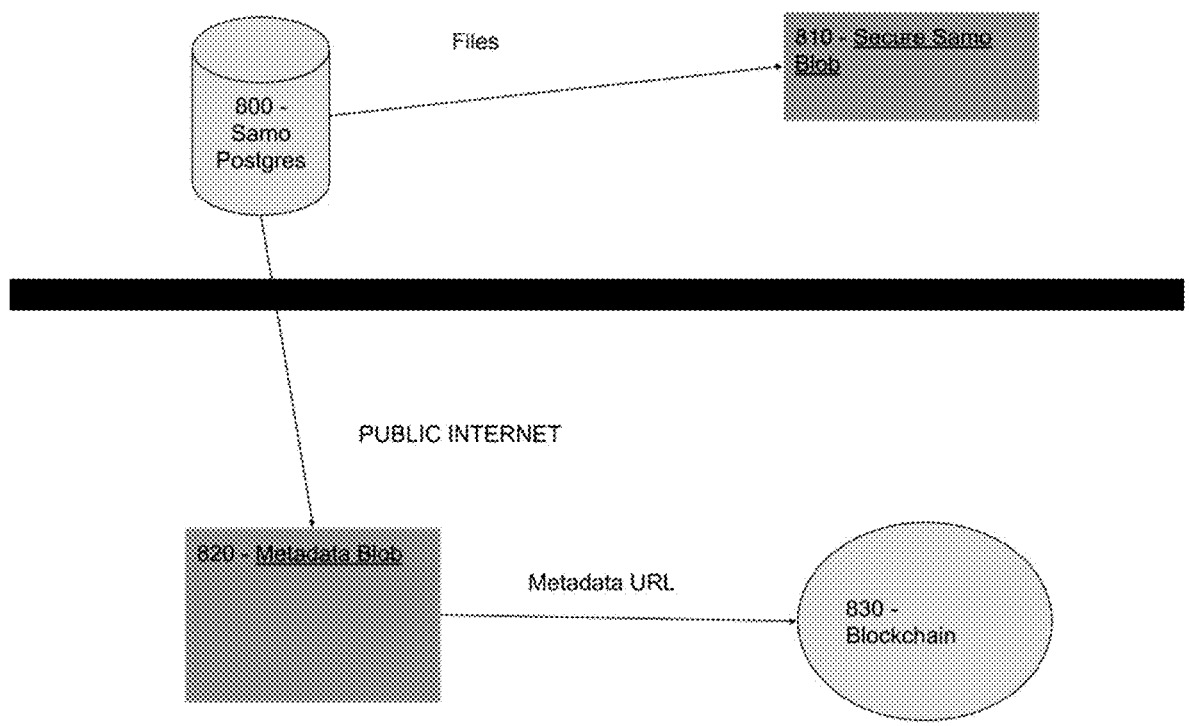
FIG. 8 is a system for Storage of Data to Cloud and Blobs.

FIG. 8 is a schematic depiction of data storage. A database 800, which is part of a server network, which runs at least a part of the Application. Project data is stored in database 800. Files are uploaded to a secure file storage blob 810. The secure file storage blob 810 provides enhanced security for protection of IP and other proprietary data. It also ensures long term preservation and protection of the data. The project data and double hash and permanently linked JSON File are stored on a public metadata blob 820. The stored data is the value of the token meta data. The permanent URL of the JSON file is passed along to and becomes the token uri and also eventually becomes the value of the token. Once this occurs, the permanent URL of the JSON File becomes the metadata URL which is updated as the token Uri in the smart contract stored to the blockchain 830. This is the most up to date metadata and therefore reflects as the token uri.

Figure 9:
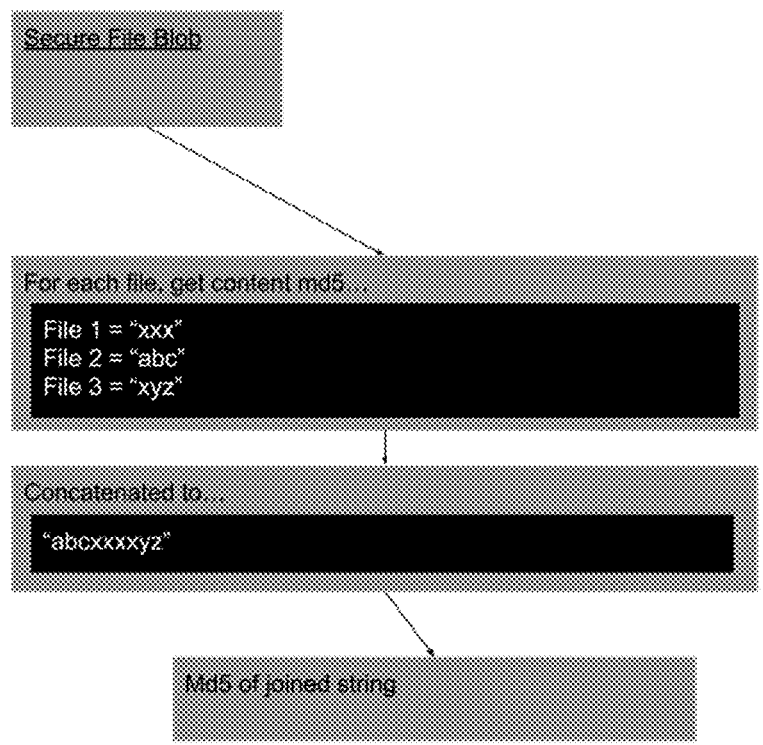
FIG. 9 is a Secure File Blob.

FIG. 9 is an example of how the hashes of individual files are taken and concatenated into a hash string. This hash string is then given its own hash with the MD5 mechanism.

Figure 10:
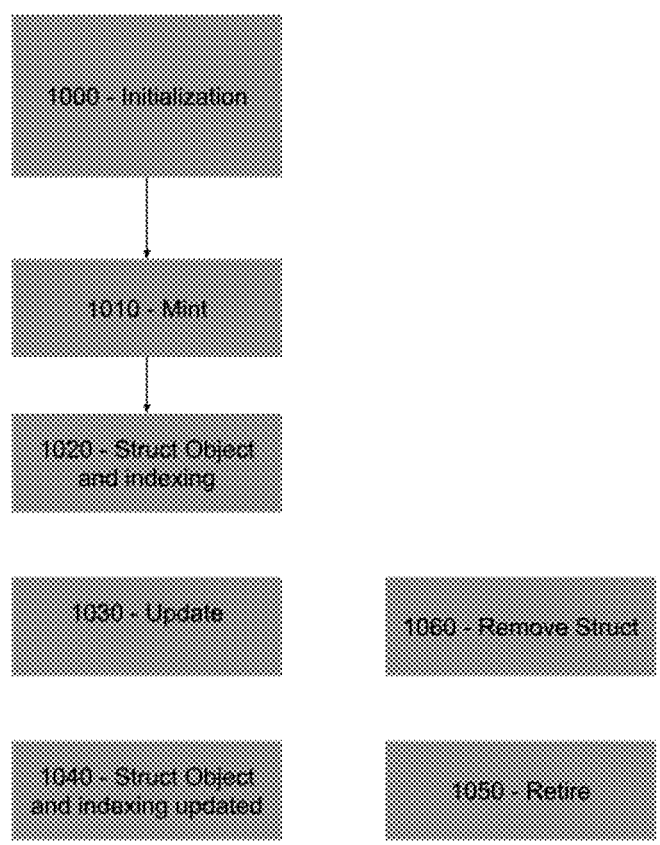
FIG. 10 is a flowchart of a Smart Contract Lifecycle.
Figure 11:
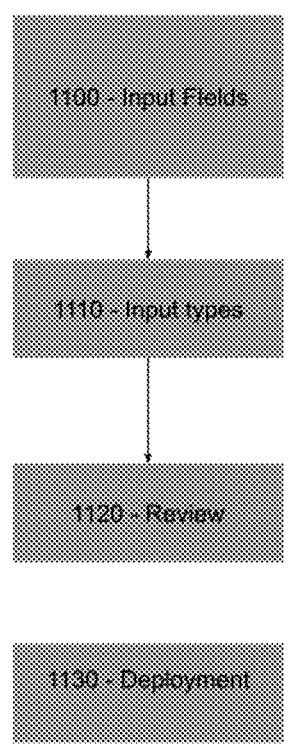
FIG. 11 is an Admin Panel.

FIG. 10 depicts a smart contract life cycle. Block 1000 is a project initialization when a project is created and all resources necessary to properly log it into a token are created in the smart contract. The tokenization process begins in block 1010. In block 1010 the token is minted with all of the data needed for the project. The minting process is discussed above with respect to FIGS. 3 and 7. In block 1020, in the contract, a new token is added to the contract's supply. The new token is then tracked using a Struct Object which is a model used for data formatting in solidity, the smart contract language. The double hash and metadata URL are indexed so that all project data are tied to both identifiers. In block 1030 an update occurs. An update is when project data or files are changed, for example an ownership change or file modification, this triggers the amendment process discussed above with respect to FIG. 4. After an update, in block 1040, the Indexing and Struct Object processes are revised in a same manner as occurred in bock 1020, which are repeated and updated. Contracts do not have to be permanent. When a user wants to terminate or retire a contract a retire function is triggered in block 1050. Because the blockchain is permanent, a retire process is required to represent that an NFT is closed. According to one aspect of the invention, the system marks all meta data and token statuses as retired. After an NFT is retired, in block 1060 the smart contract the Struct Object is removed and therefore it is not actively tracked and therefore cannot be changed FIG. 11 is a flowchart for establishing Admin Input Fields. In block 1100 input fields are set up as desired by a client. This would be the categories of data relating to each project that they would like to store. For example they could have ownership names, inventor names, and the like. Any category that a client would want to be tracked can be set up here. In block 1110, input types are whitelisted, whether it is a number, a text string, a table, a phone number that needs to be formatted, or the like. This allows for proper data collection in the needed format. Next, the fields would be reviewed and approved (block 1120). The fields and formatting requirements are summarized for review, typically by a high level client employee to approve that all fields and types are set up properly and included. This review ensures that the system is ingesting the proper data. After the review, an Admin Panel is then deployed in block 1130 to the front end software so that the users are able to input data in a user friendly format. The back end resources are initialized in this step. Deployment of the backend resources includes deploying a containerized production server, which is the Samo application, a SQL database for the Samo application, an SQL database for ingestion of client data, serverless functions including but not limited to minting tokens, creating metadata URL, updating new project version, retiring old project version, and a proprietary Blockchain API that communicates data from the application to the smart contract. After the input interface is established, the data input discussed above with respect to FIG. 1 begins.

Figure 12:
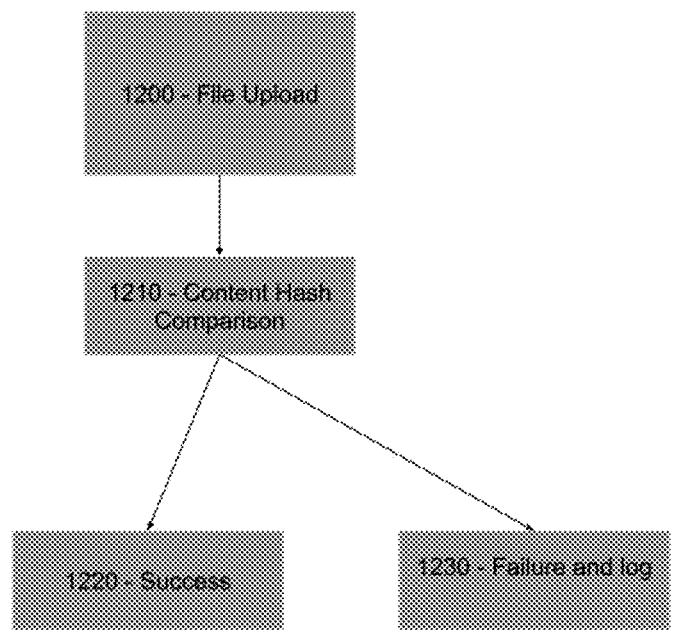
FIG. 12 is a Single File Verification.

FIG. 12 is a flowchart depicting a single file verification. In a first block 1200 a single comparable file is loaded into a storage blob and its content is calculated into an MD5 hash. Next, in block 1210, the comparable content hash is checked against all existing content hashes on all existing NFT's, active or inactive. When a comparable hash exists on an NFT, a success will be returned marking which hash matched and which token it matched for. In other words, the content is already tokenized. Alternatively, failure in block 1230 indicates that the comparable hash does not match any NFT contents in existence. According to one aspect of the invention, this failure is logged and tracked for security and review purposes.

Figure 13:
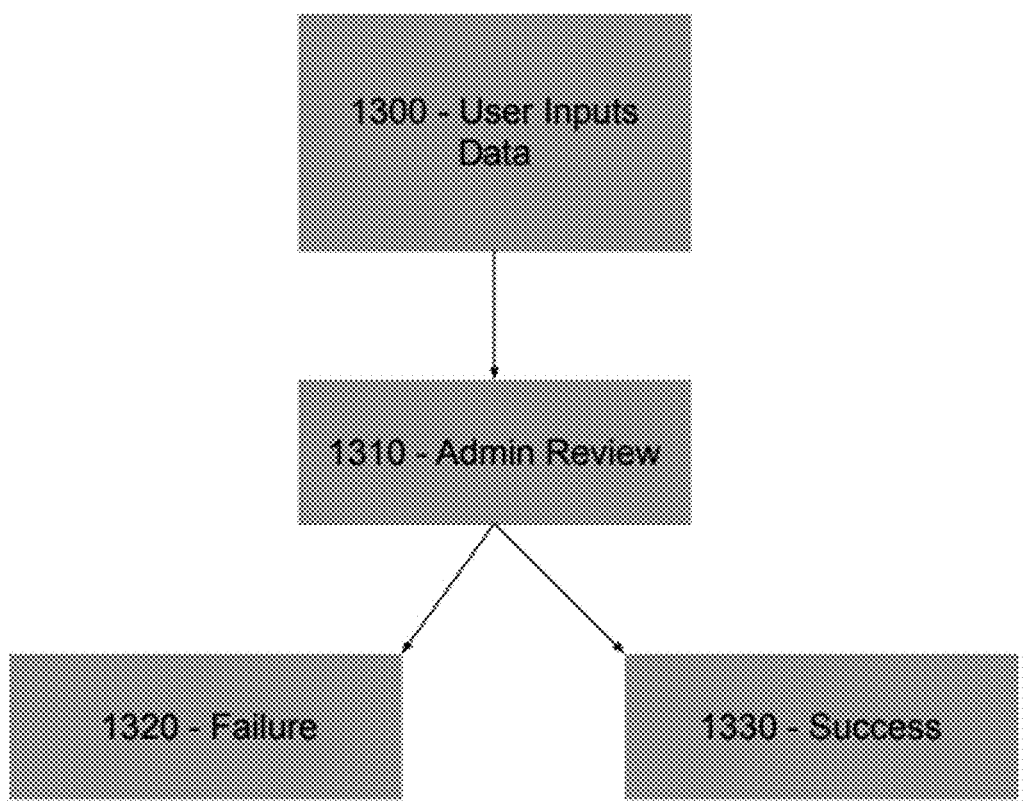
FIG. 13 is a Review Process.

A review process is shown in FIG. 13. A user with input only permissions inputs all data to populate Input Fields in block 1300. It should be noted that other permissions are available and limiting input to an input only permission prevents other fields from being inadvertently changed. Once input the inputted data is sent to an administrative level account for approval. Administrator level account with no input privileges but approval privileges reviews information to check for any errors or missing information in block 1310. The approval process is a manual review by a superior level employee as a check to help prevent any missing or incorrect information from passing into the blockchain. According to one aspect of the embodiment, the approval is automated, reviewing the data for proper formatting and verifying data via external sources where possible. If the review fails or incorrect information is found, the admin level user denies the request and the form is bounced back to the Input User (1320). The process then returns to block 1300 where the original or another user corrects the input data. These steps are then repeated until the information is correct and acceptable to the Admin Level Reviewer at block 1330. The next step after the success process at block 1330 is block 130 in FIG. 1.

The present platform is applicable to, medical records, asset management, digital media records, and the like.

One application of the disclosed platform is organizing and maintaining medical records. Medical records, images including x-rays, MRIs, and CT scans, and documents relating to a patient's medical history are disorganized and inaccessible. Each doctor's office maintains the records of each patient that visits that office. This makes it very difficult to have a single complete history of medical records as well as accessing them. Additionally many medical records are maintained using paper systems or outdated computers. Thus, medical records have not advanced at the same rate as modern medicine.

The disclosed platform can be used to store, protect, and access medical records with ease and the assurances that all data would be safe and compliant with any regulations. The platform can be configured to load all files and data into one NFT that would link to a wallet of all visits for a patient, not only would there be one complete history of that patents medical data, but it would also be more easily accessible for that patient. The patient could then share the wallet with doctors or other professionals during a visit. The patient wallet can be password protected or encrypted for privacy. Additionally, the NFT can be encoded or encrypted to maintain patient confidentiality.

According to one aspect of the invention, the process of tracking medical history could be as broad as a patient's entire medical history or as narrow as one medical incident or a portion thereof.

For this example, a patient has a medical incident, specifically, a broken wrist. The project would begin with the initial patient intake. The project would be created in the Samos front end. As discussed above, the previously created input fields would be shown on a graphical user interface (GUI) and would populated with patient specific information. The fields can include but are not limited to patient name, date of birth, address, insurance information, description of the injury, and treatment plan. This information along with other related files such as prescription files, x rays, medical scans, etc. could then all be processed through the platform. All of the files and information would then be tokenized and stored in the storage blob for verification, easy storage, and accessibility.

The project could be amended for each progress visit and treatment. Amendments would contain updates to all of the previous input fields as well as more files if, for example, there were more x-rays done or prescriptions written. These updates, which would be revised NFTs, would allow a patient to easily track and access the entire history of an injury. This would allow for better tracking for insurance purposes, continuing medical treatments, or exams. Such a record would also provide easy access to one's own medical information.

Currently sharing medical information among medical professionals is a difficult and inefficient process. For example, to share x ray images from one doctor with another, a patient may have to retrieve physical copies and bring them to the new doctors or have them sent by some other manner such as email for electronic files.

With Samos, the platform provides a patient with access and the ability to securely share these files and doctors would be able to rely on the accuracy and validity of the files. The platform removes the outdated method of doctors housing patient's medical files and the distributed nature of a patient's medical history, in contrast to the one complete medical history for a patient, which would streamline the record keeping and sharing process for medical records.

The Platform is also applicable in recording asset ownership and asset history, particularly with respect to in real estate, where recording asset transfers is important. The platform allows for the tracking of a complete history of an asset. Using an NFT and amendments the history of an asset from ownership changes, large incidents that damage the asset, improvements of the asset, assessments, and the like are recorded on the blockchain. Having all of these records stored in one place that is easily auditable adds tremendous value to owners not only for managing the asset but also upon disposition of the asset. Having no uncertainties when it comes to a due diligence period for a purchase eliminates ambiguity that can be used to a buyers advantage in negotiation. Additionally the NFT and blockchain provide an immutable property record that can be easily updated and verified.

One application of the platform is a title history of a real estate asset. A project would be created during an initial purchase of a property or at a time the platform is initiated. Input fields such as property address, owner name, tax parcel number, purchase price, financing information, and the like could be entered. Files that could then be attached to it would include items such as title reports, surveys, environmental reports, architectural plans of the existing conditions, structural reports, loan documents, financial statements, and the like. This information would all be processed through the platform, tokenized, and stored on the cloud and blockchain. The record creates a verifiable status of the property at a given point in time that can be easily referred to. The record removes any uncertainties regarding the history of the building and makes for a more seamless due diligence and managerial process going forward.

Amendments to the history would include events such as a refinancing, an annual vacancy update, renovations, and environmental assessments, easements, and the like. Each time one of these occurs the history of the property would be amended. This creates a traceable and verifiable history of all major events in a property's existence.

This record provides incredible value in managing and selling or refinancing a building or property to maximize its value. Removing ambiguity is a huge benefit in a negotiation regarding the value or providing relevant information to an appraiser. Uncertainty regarding property condition or history can often negatively impact the value and therefore decreases the return from a refinance or sale. Being able to easily prove and access the history and current conditions would not only increase the value but also make for a smoother, quicker, and more efficient process.

Digital Media is today's most prevalent art form. As the world moves away from physical art, movies on tapes, and CD's and towards streaming music and video and digital graphics, a new litany of problems has emerged. These advancements have led to a more fluid and collaborative creative process. There can be many artists involved in a single work that all have different rights and claims to the work. This can create disputes amongst artists, companies in the industries, and other parties on how revenues, title rights, etc., flow after a successful work is produced.

One example of this is the music Industry. With various PRO's and MRO's that distribute royalties to artists from the Record Labels which ultimately own the titles of the music the complexity creates difficulties in tracking rights.

By using the SAMOS platform to compile and solidify this data using the blockchain and cloud, it greatly eases the burden and difficulty of tracking and subsequently proving the information. All artist information, label information, and publisher information is easily tracked and accessed limiting the disputes arising from the work and effort needed to properly execute this tracking and access.

The process of tokenizing digital media begins with inputs of relevant fields such as artist information, compositions information, work title, record label, publisher and a multitude of other relevant information relating to the work. The complexity of ownership requires these fields to be created as various mendable tables and check boxes. According to one embodiment of the invention, the inputs to create a token can also be used to generate copyright applications, ASCAP records, and the like.

Figure 14:
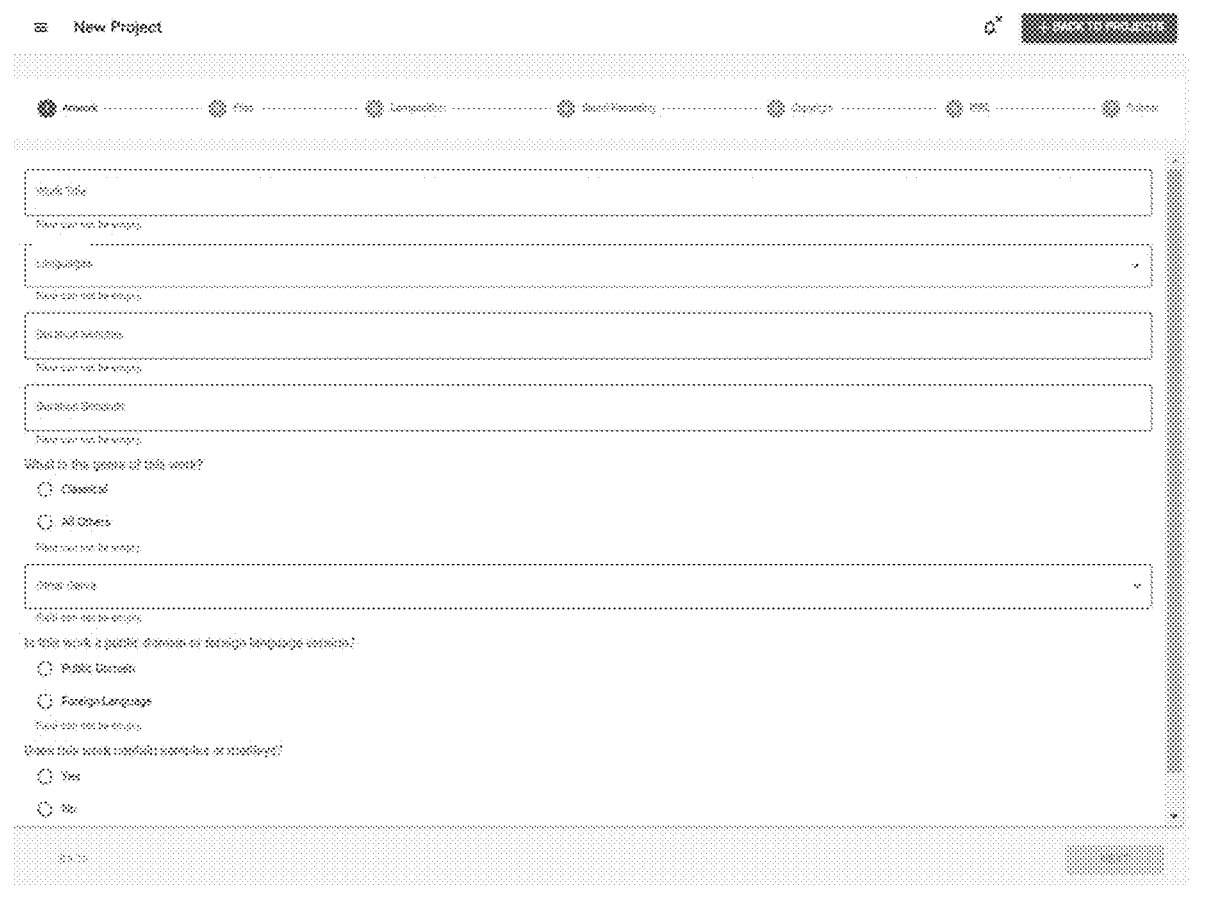

An input field for music rights is shown in FIG. 14. The relevant fields include, work title, language, duration, genre, public domain, and whether the work contain samples. Data is entered by a combination of drop down menus, radio buttons and the like for uniformity. These data points are entered by an authorized user and verified.

Figure 15:
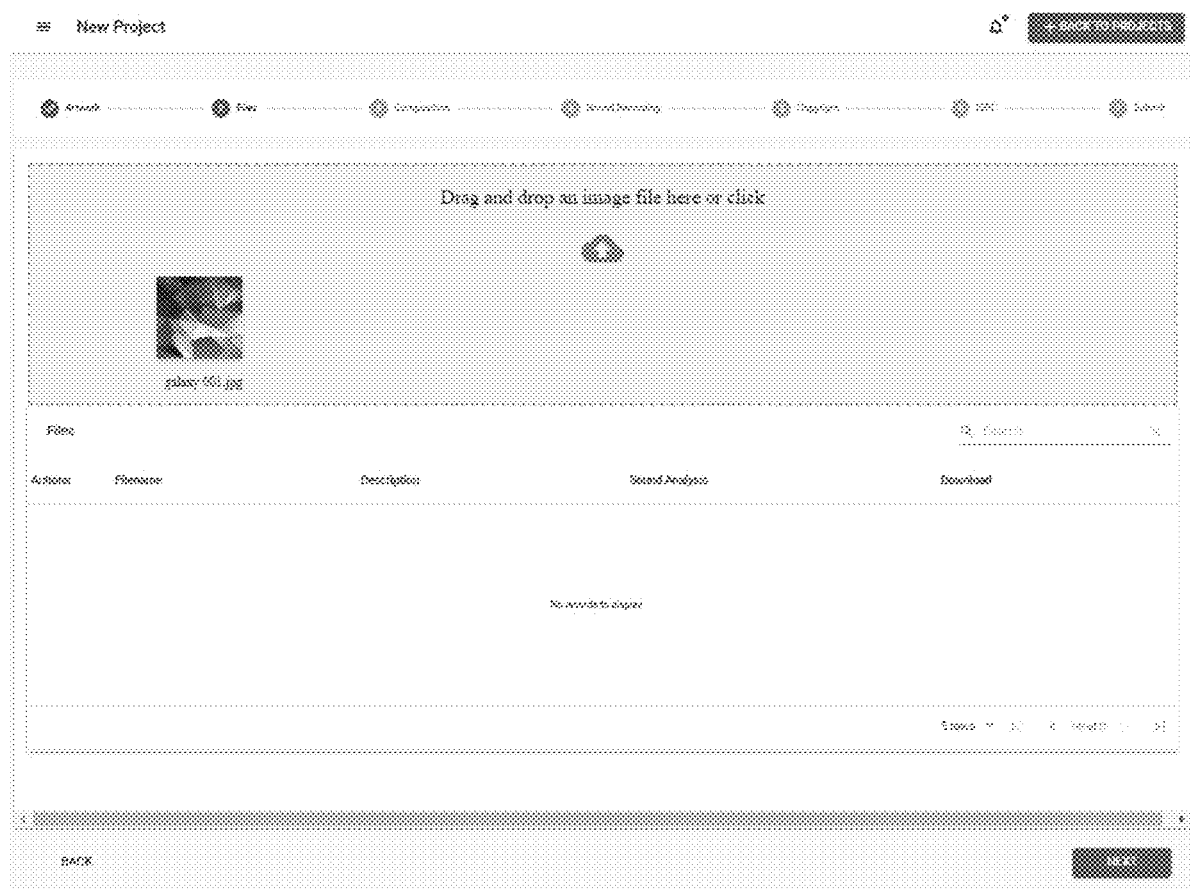
FIG. 15 is an upload screen.

Next, the relevant file or files are uploaded on a screen shown in FIG. 15. The files uploaded include MP3 files, MP4 files, and other audio or video files. Once the files are submitted the system is configured to run a comparison of the upload file against a database of other works such as a sound analysis. Additional files such as agreements, assignments, and other administrative documents can be attached and tokenized.

Figure 16:
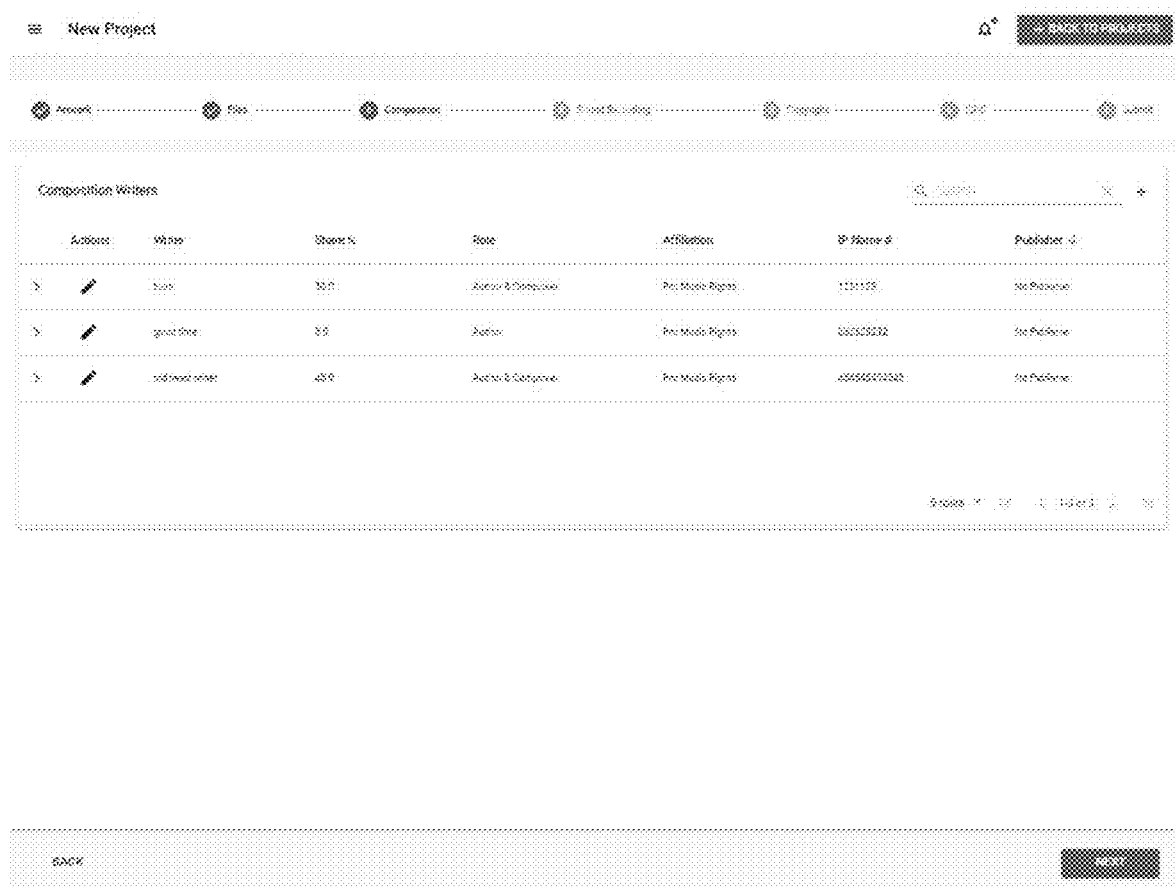
FIG. 16 is an ownership/authorship screen.
Figure 17:
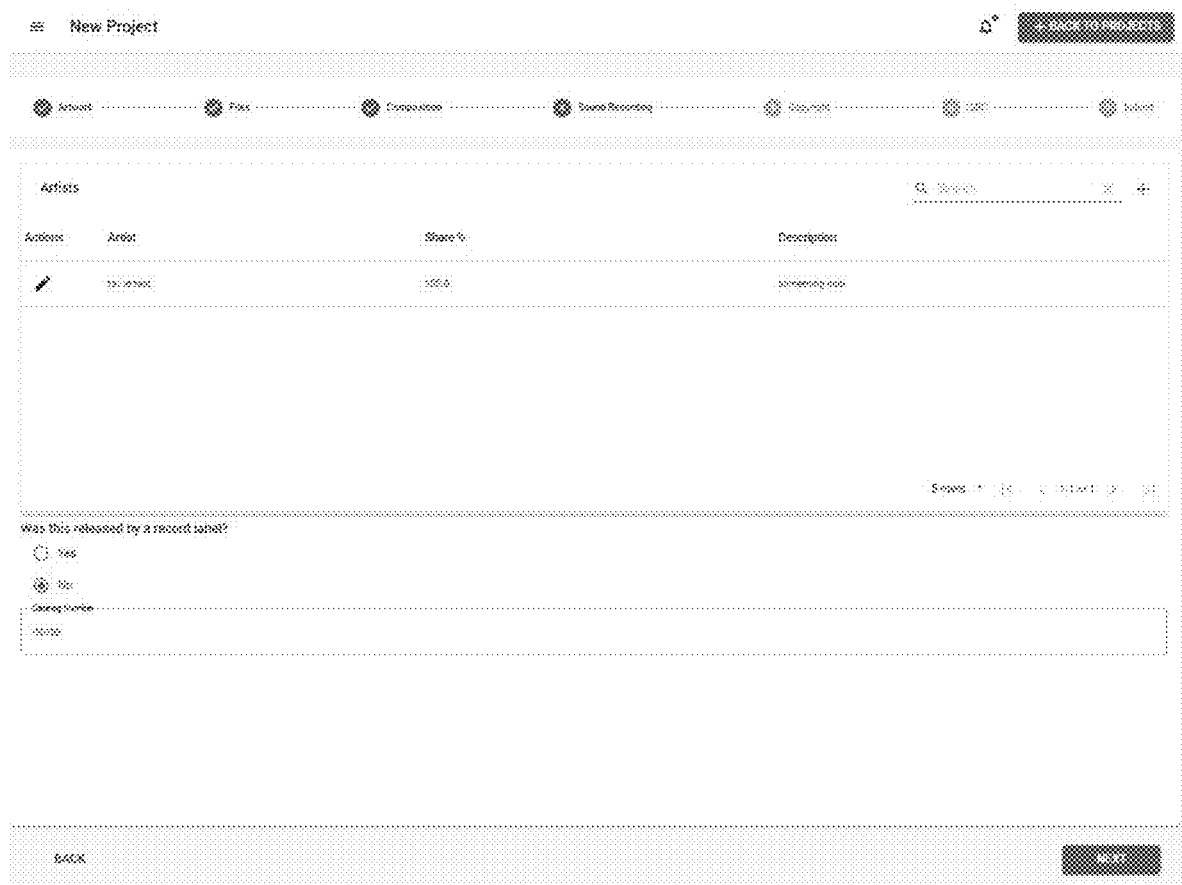
FIG. 17 is an artist screen.
Figure 18:
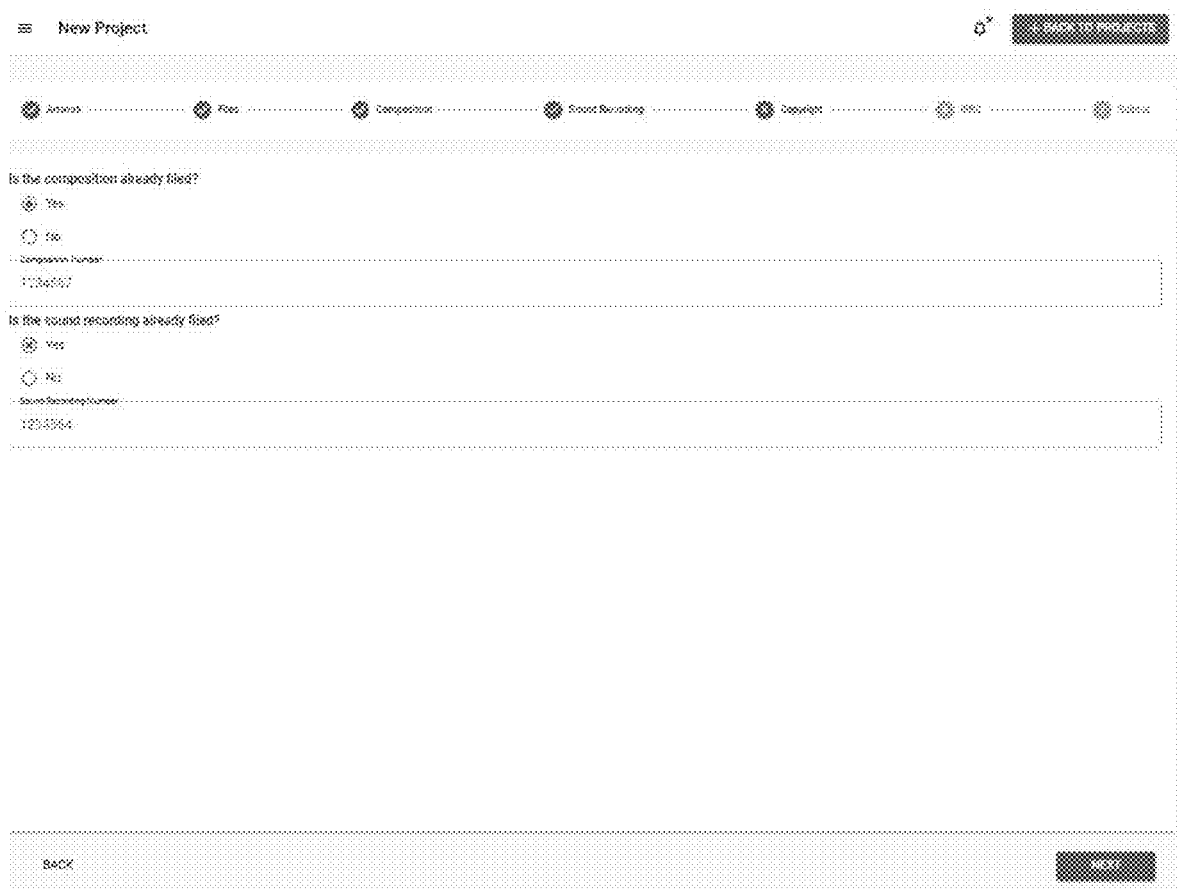
FIG. 18 is a screen used to record copyright information.
Figure 19:
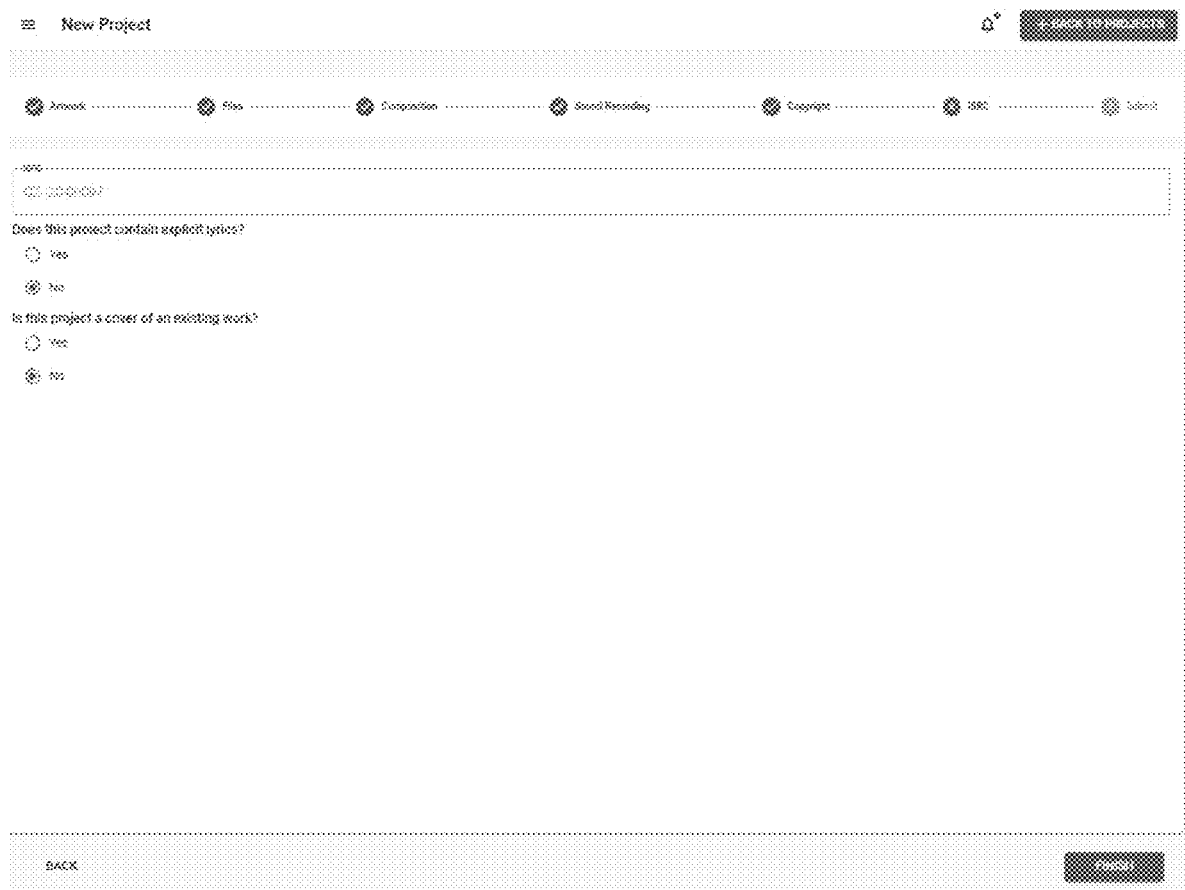
FIG. 19 is a screen used to record ISRC data.
Figure 20:
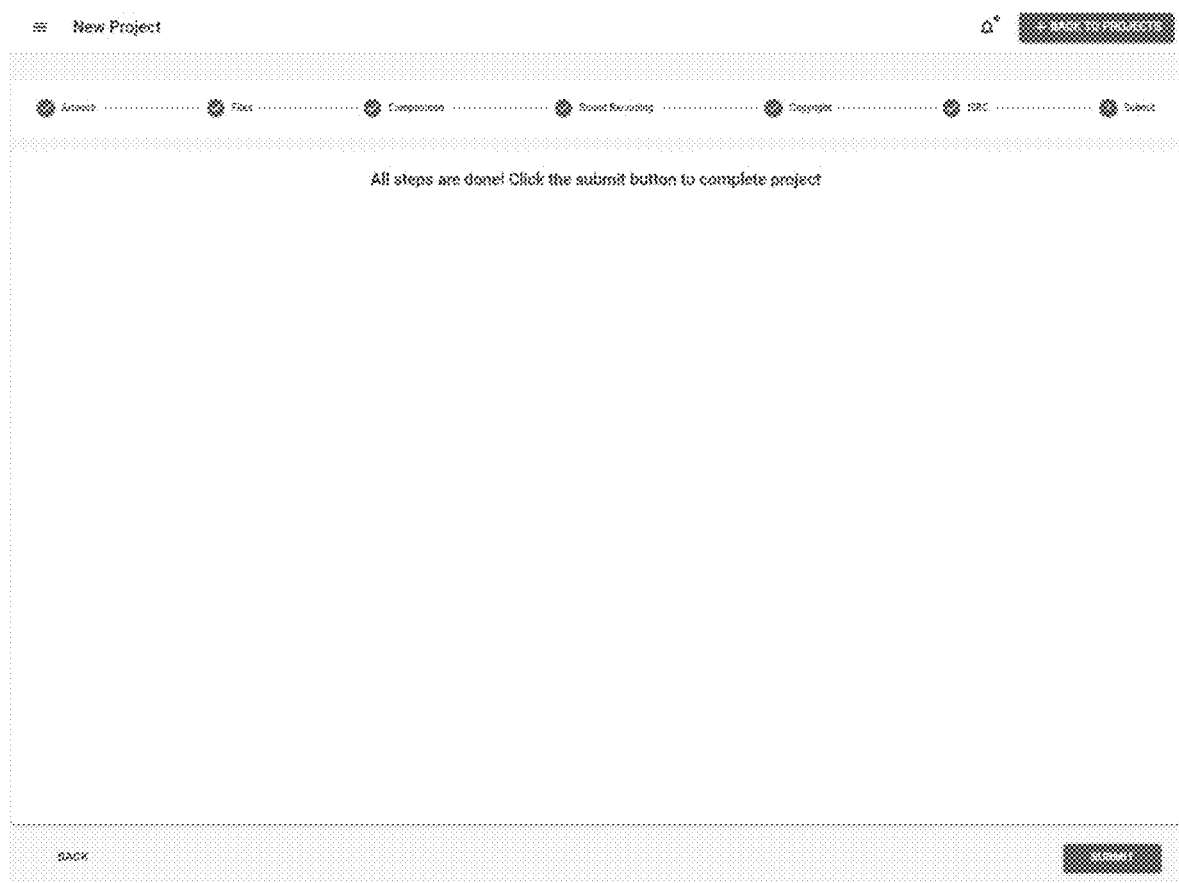
FIG. 20 is a submission screen.

Another data field to be entered is authorship, composer, and share. This data is entered in a GUI shown in FIG. 16. Similarly FIG. 17 provides a screen to enter artist data. For repeatability, writers are stored in a database to enhance the data entry process. A GUI shown in FIG. 18 is used to record copyright information. Radio buttons are provided to record whether the composition is filed, whether the sound recording was filed, and if the files should be filed if they have not been. The screen in FIG. 19 is used to record ISRC data. Finally, once all of the data is entered, it is submitted for tokenization as shown in FIG. 20. Once submitted, the work will then be processed storing all of the information and files in the storage blob and tokenizing it on the blockchain.

Figure 21:
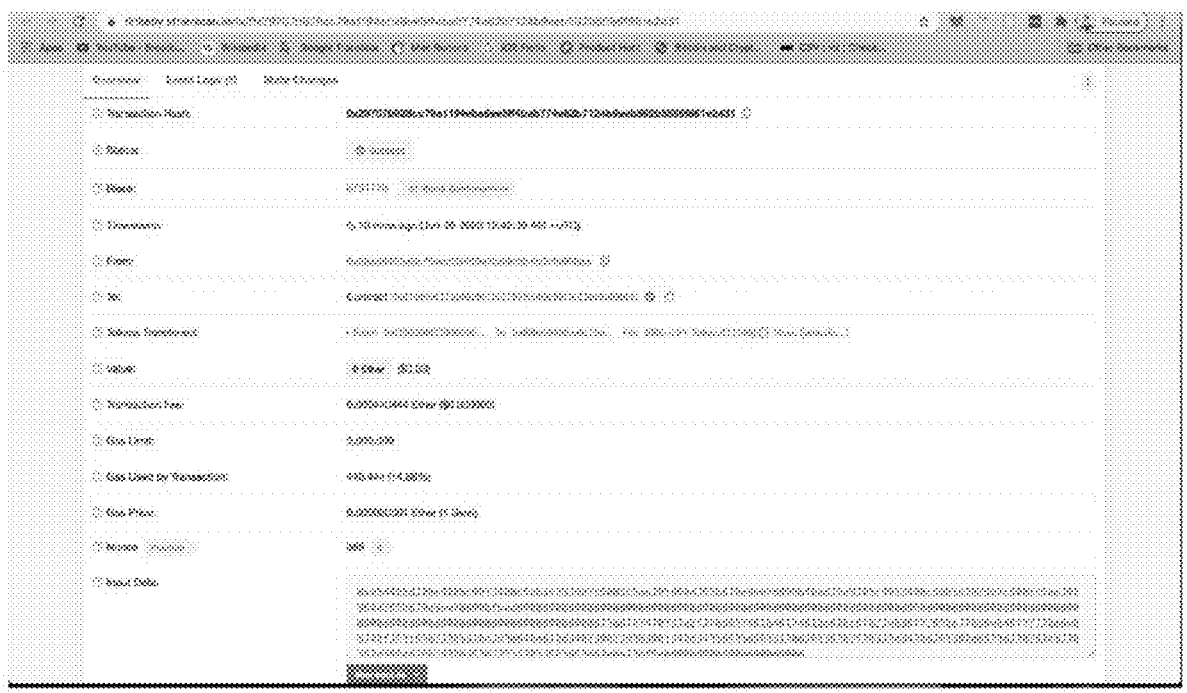
FIGS. 21 and 22 are blockchain transactions.
Figure 22:
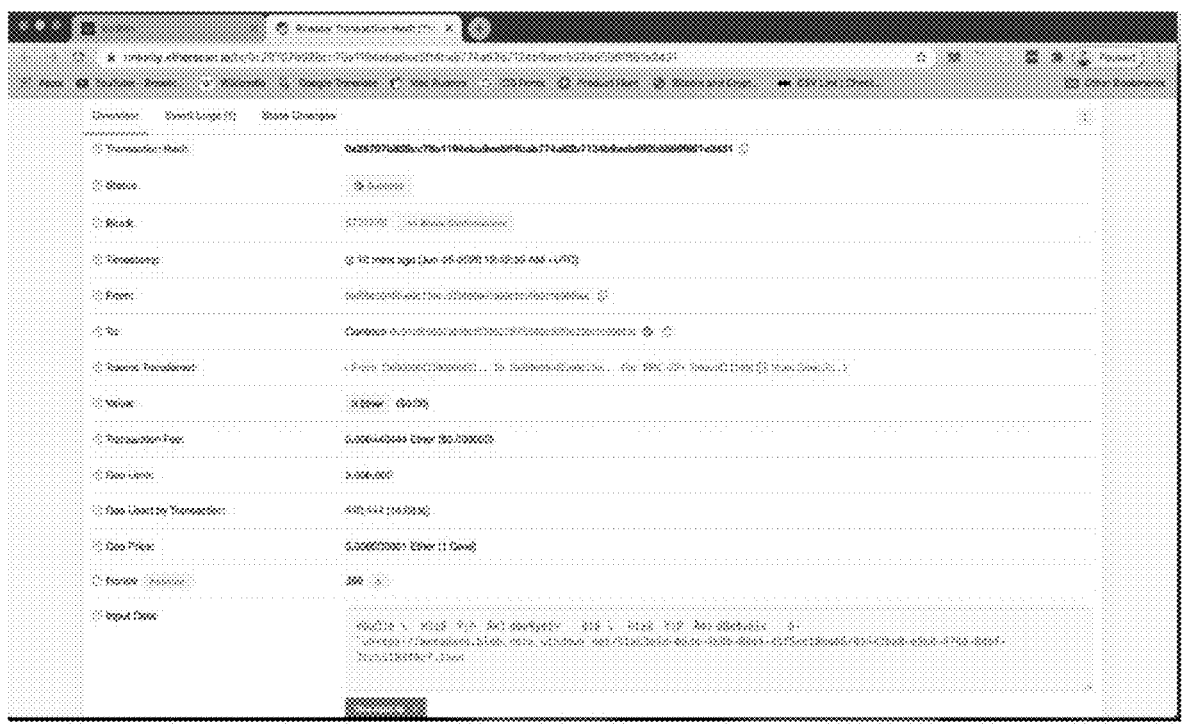

FIGS. 21 and 22 are blockchain transactions. The blockchain transactions record the parties between whom the generated tokens are transferred. Additionally, the blockchain transaction records a timestamp for the transaction, transaction fees, input data, and the like.

Figure 23:
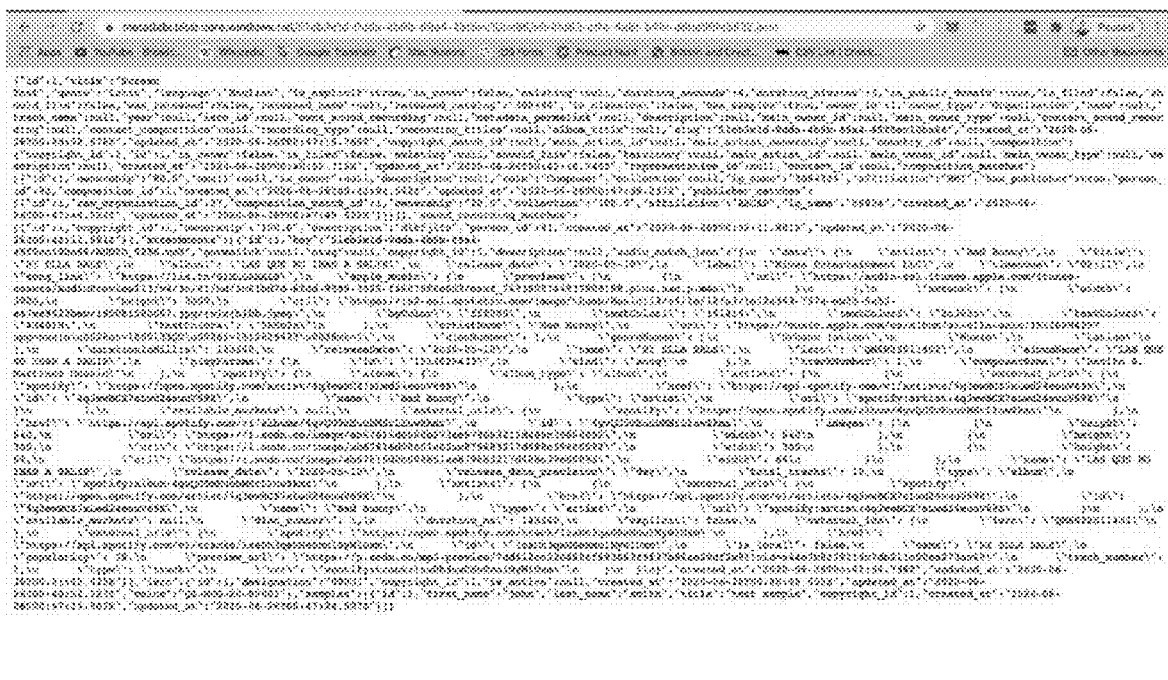
FIG. 23 shows metadata.

FIG. 23 shows the generated and stored metadata for a given transaction. It should be noted that the metadata can be viewed in an application that presents the data in a form-like format for easy viewing.

Figure 24:
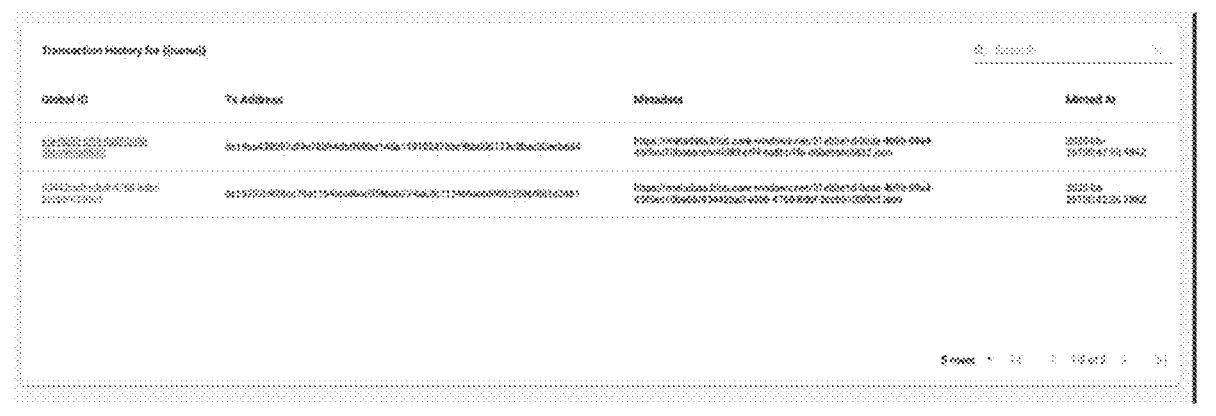

FIG. 24 shows a transaction history. The transaction history provides such fields as an ID, a Tx address, metadata for the minted coin, and the time at which the coin was minted.

Figure 25:
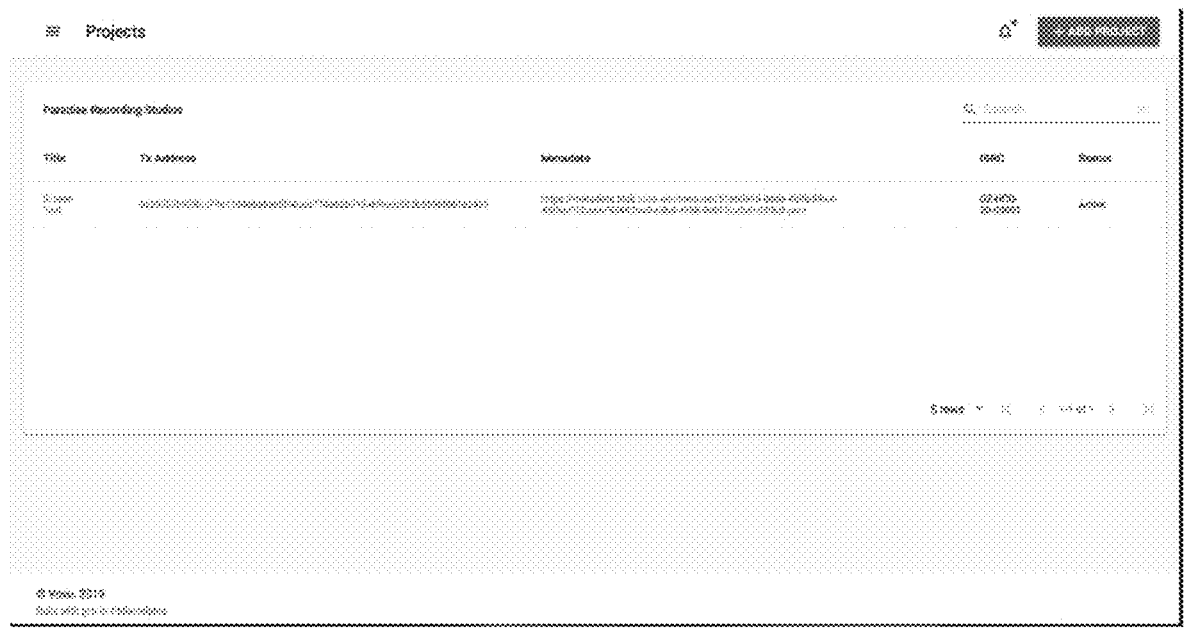
FIG. 25 is a project screen.

FIG. 25 is a project screen. The project screen presents such fields as a project title, x address, metadata, ISRC, and status. As noted above, the metadata can be viewed in an application that presents the data in a form-like format for easy viewing. Projects can be viewed in a number of manners including coin owners, coin generators, data content, or the like.

Figure 26:
FIGS. 26 and 27 show metadata changes in a transaction.
Figure 27:
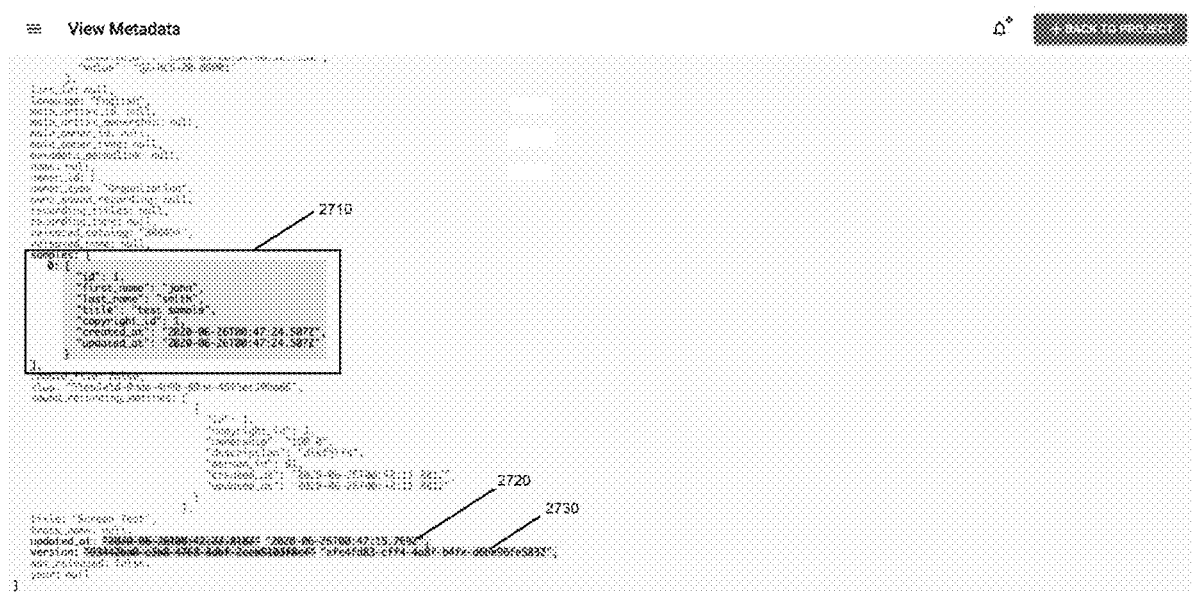

FIGS. 26 and 27 show transaction history change screenshots. The Figures depict the version history and changes. In FIG. 26, the changes include a publisher false/true designation change 2610, ownership percentage change 2620, changes in the present version 2630, and the update time 2640. It should be noted that data change instances are shown with strikethroughs for old or changed data and the latest active data appended thereto. In FIG. 27, the data added is shown at 2710, the time of the update is shown at 2720, and the revised version is shown at 2730.

Figure 28:
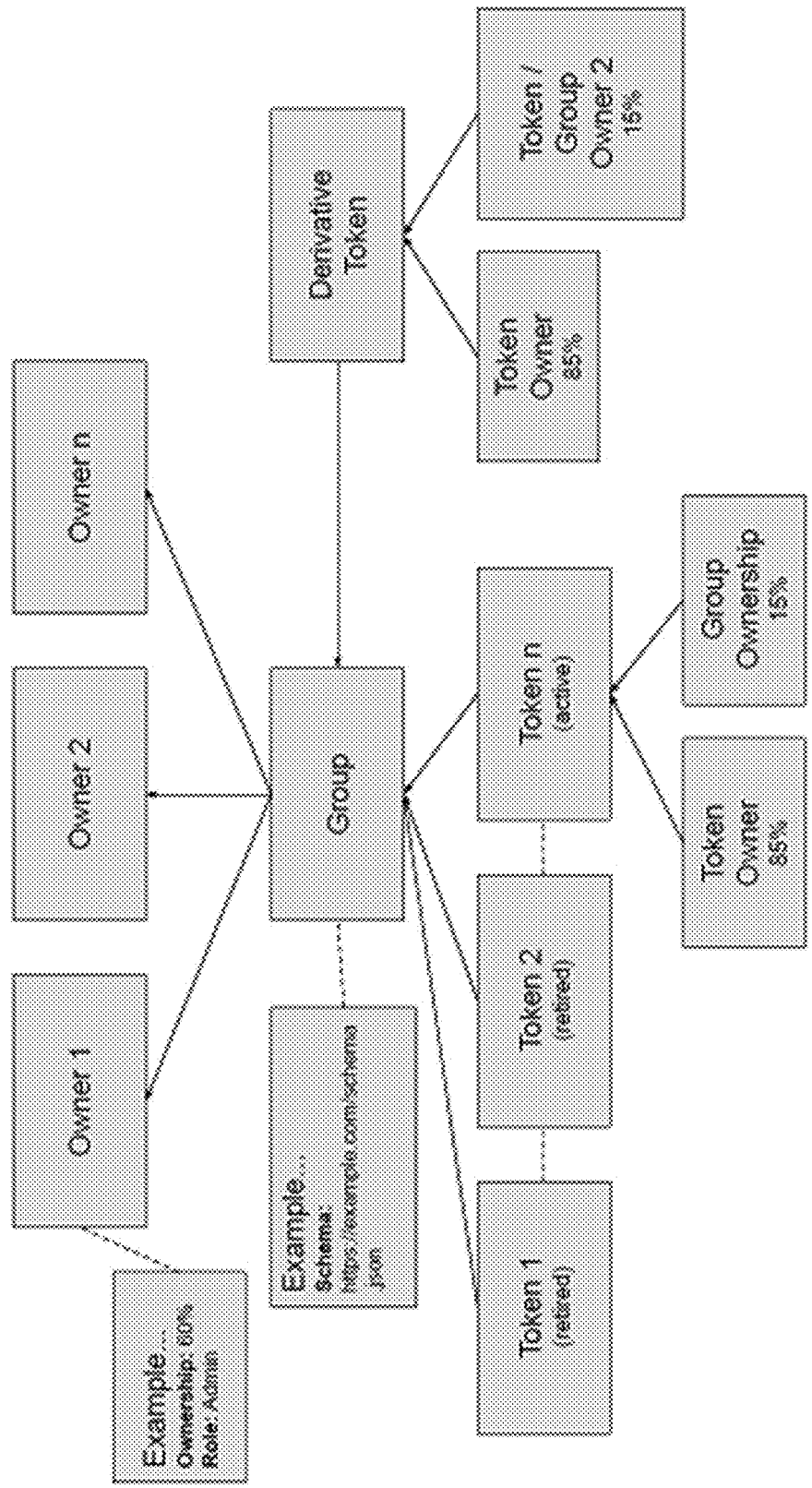
FIG. 28 Is an overview a structure of token ownership and grouping.

FIG. 28 is an overview showing the relationship between token ownership and grouping. As shown, multiple owners can be involved and referenced within a token or group as well as these individual or other tokens being part of a group. Tokens that are updated versions of the original master token or marked as derivatives to be included as part of the group with separate attribute fields are designated. In the example of FIG. 28, three (3) owners are depicted, although any number of owners are contemplated and can be accommodated. One owner, Owner 1, is shown having a greater ownership percentage and is also designated as an Admin. Any distribution of ownership percentages, whether they be weighted or equal is contemplated. As shown, both active and retired Tokens are tracked as well as derivative tokens. Further, as shown, ownership can be shared between token owners and group ownership.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A method for storing data on a blockchain, comprising:
receiving data for at least one data field;
receiving at least one data file, wherein the data file and data field are not preconditioned by security measures such as password protection or specific formatting;
individually hashing each of the at least one data field and the at least one data file through a process independent of secure data management practices, such as password management or data identification reliant on an integrity of an originator's system;

concatenating each of the hashes of the at least one data field and the at least one data file in a predefined order, wherein the concatenation does not incorporate or depend upon external security features or identifiers;

generating a singular hash representing all of the individual hashes, wherein this singular hash serves as a unique identifier for storage on the blockchain, independent of any external security mechanisms or formatting requirements;

wherein:

the individually hashing of at least one data file employs an MD5 algorithm, selected for its efficiency and suitability for checking file integrity;

for hashing of the at least one data field, a second implementation of the algorithm is utilized, providing a different level of security and integrity check compared to the MD5 algorithm; and the individual hashes of the data fields and data files are ordered and then concatenated through a process combining hashing algorithms, with the singular hash being generated.

2. The method for storing data according to claim 1, wherein the at least one data field, and the at least one data file are validated as relational, without relying on source authenticity, based at least in part on the singular hash.

3. The method for storing data according to claim 1, wherein the individually hashing of the at least one data field and the at least one data file produces a 128-bit value.

4. The method for storing data according to claim 1, wherein the individual hashes are produced using a hashing process that is a hashing algorithm.

5. The method for storing data according to claim 1, wherein the concatenation is at least one of literal alphabetical, size, or opposite alphabetical.

6. The method for storing data according to claim 1, wherein a non-fungible token contains a singular hash representing the individual hashes.

7. The method for storing data according to claim 1, wherein a non-fungible token is retired when one of more of the at least one data field and the at least one data file is changed and a revised non fungible token is generated.

8. The method for storing data according to claim 1, wherein a non-fungible token includes ownership data.

9. The method for storing data according to claim 8, wherein the ownership data refers to one or more owners.

10. The method for storing data according to claim 1, wherein a non-fungible token is updated to create a new non-fungible token.

11. The method for storing data according to claim 10, further comprising:

determining if one or more of the non-fungible token and/or the new non-fungible token is a derivative token; and marking the non-fungible token and/or the new non-fungible token as derivative.

12. The method for storing data according to claim 1, further comprising:

creating one or more of a group and group owner; and assigning ownership to the one or more of the group and the group owner.

13. The method for storing data according to claim 12, further comprising:

creating a new token when an update is triggered; and storing the new token within the group that was previously created.

14. The method for storing data according to claim 1, wherein a non-fungible token is minted in accordance with ERC-721.

15. The method for storing data according to claim 4, wherein the hashing algorithm is an MD5 hash algorithm.

16. A method for storing data on a blockchain, comprising:

receiving data for at least one data field;

receiving at least one data file, wherein the data file and data field are not preconditioned by security measures such as password protection or specific formatting;

individually hashing each of the at least one data field and the at least one data file through a process independent of secure data management practices, such as password management or data identification reliant on an integrity of an originator's system;

concatenating each of the hashes of the at least one data field and the at least one data file in a predefined order, wherein the concatenation does not incorporate or depend upon external security features or identifiers;

generating a singular hash representing all of the individual hashes, wherein this singular hash serves as a unique identifier for storage on the blockchain, independent of any external security mechanisms or formatting requirements;

utilizing the hashing process that employs at least the MD5 hash algorithm;

applying at least the MD5 algorithm to create a singular, indistinguishable hash of one or more data inputs or data files;

wherein the combined hashing process generates a singular hash that aids in preventing manipulation and misinterpretation of the data; and providing for recall of data inputs or data files by an end user, enhancing the integrity of access, whether the data is stored publicly or privately.

17. A method for storing data on a blockchain, comprising:

receiving data for at least one data field;

receiving at least one data file, wherein the data file and data field are not preconditioned by security measures such as password protection or specific formatting;

individually hashing each of the at least one data field and the at least one data file through a process independent of secure data management practices, such as password management or data identification reliant on an integrity of an originator's system;

concatenating each of the hashes of the at least one data field and the at least one data file in a predefined order, wherein the concatenation does not incorporate or depend upon external security features or identifiers;

generating a singular hash representing all of the individual hashes, wherein this singular hash serves as a unique identifier for storage on the blockchain, independent of any external security mechanisms or formatting requirements;

individually hashing each data input or data file to produce distinct hashes for each data input or data file;

subsequently ordering these individual hashes in an alphanumerical sequence, wherein the ordering is based on alphanumeric characteristics of the hashes themselves, rather than the received data inputs or files; and following the alphanumeric ordering, generating a singular hash that encompasses the ordered individual hashes, which is then associated with a non-fungible token.

18. A method for storing data on a blockchain, comprising:
- receiving data for at least one data field;
- receiving at least one data file, wherein the data file and data field are not preconditioned by security measures such as password protection or specific formatting;
- individually hashing each of the at least one data field and the at least one data file through a process independent of secure data management practices, such as password management or data identification reliant on an integrity of an originator's system;
- concatenating each of the hashes of the at least one data field and the at least one data file in a predefined order, wherein the concatenation does not incorporate or depend upon external security features or identifiers;
- generating a singular hash representing all of the individual hashes, wherein this singular hash serves as a unique identifier for storage on the blockchain, independent of any external security mechanisms or formatting requirements;
- associating ownership data within each non-fungible token to denote one or more owners, where each token—be it a master or a derivative token—represents a distinct element in a comprehensive relationship tree;
- highlighting that the ownership data in non-fungible tokens encapsulates more than mere possession and represents a unique tracking system that links data with its accessibility across different tokens within a same relationship tree, irrespective of variations in the data between master and derivative tokens;
- ensuring that each token, whether the master or the derivative, is independently created and owned by a token creator, thereby establishing distinct ownership and responsibility for the token's data within its group of related tokens; and
- involving individual creation and ownership of each token, with a unique emphasis on a relational aspect among tokens within a shared network or tree, regardless of data similarities or differences.

19. A method for storing data on a blockchain, comprising:
- receiving data for at least one data field;
- receiving at least one data file, wherein the data file and data field are not preconditioned by security measures such as password protection or specific formatting;
- individually hashing each of the at least one data field and the at least one data file through a process independent of secure data management practices, such as password management or data identification reliant on an integrity of an originator's system;
- concatenating each of the hashes of the at least one data field and the at least one data file in a predefined order, wherein the concatenation does not incorporate or depend upon external security features or identifiers;
- generating a singular hash representing all of the individual hashes, wherein this singular hash serves as a unique identifier for storage on the blockchain, independent of any external security mechanisms or formatting requirements;
- facilitating creation of groups and group owners, where a group may consist of multiple non-fungible tokens, including both master and derivative tokens;
- assigning ownership of each non-fungible token, whether it is part of a group or not, directly and exclusively to a creator of the token, ensuring that each token's ownership is established by an individual responsible for its creation; and
- where each owner independently creates and retains ownership of their respective master and derivative tokens, regardless of whether these tokens become part of an existing group; and
- ensuring that ownership of tokens, both individual and within groups, is not designated or transferred by any external entity or system, but is solely determined by the creator of the token, thereby maintaining clear and direct ownership lines.

20. The method for storing data according to claim 19, wherein a non-fungible token is retired when one of more of the at least one data field and the at least one data file is changed and a revised non fungible token is generated.

21. The method for storing data according to claim 19, wherein a non-fungible token is updated to create a new non-fungible token.

* * * * *